United States Patent [19]

Petterson et al.

[11] Patent Number: 5,333,390
[45] Date of Patent: Aug. 2, 1994

[54] ABSOLUTE MEASUREMENT SCALE SYSTEM

[75] Inventors: Bo Petterson, Torshälla; Carl E. Gustafsson, Eskilstuna, both of Sweden

[73] Assignee: C E Johansson AB, Eskilstuna, Sweden

[21] Appl. No.: 82,455

[22] Filed: Jun. 25, 1993

[30] Foreign Application Priority Data

Jun. 29, 1992 [SE] Sweden .............................. 9202005-6

[51] Int. Cl.$^5$ .............................................. G01B 3/02
[52] U.S. Cl. ...................................................... 33/706
[58] Field of Search ................... 33/700, 706, 707, 755, 33/759

[56] References Cited

U.S. PATENT DOCUMENTS

| | | | |
|---|---|---|---|
| 4,403,859 | 9/1983 | Ernst | 33/707 |
| 4,586,260 | 5/1986 | Baxter et al. | 33/706 |
| 4,991,125 | 2/1991 | Ichikawa | 33/707 |
| 5,007,177 | 4/1991 | Rieder et al. | 33/706 |
| 5,062,214 | 11/1991 | Gustafsson et al. | 33/707 |
| 5,225,830 | 7/1993 | Andermo et al. | 33/706 |
| 5,233,407 | 8/1993 | Ogata | 33/707 |

FOREIGN PATENT DOCUMENTS

| | | | |
|---|---|---|---|
| 3436681 | 5/1985 | Fed. Rep. of Germany | 33/706 |
| 4009749 | 12/1990 | Fed. Rep. of Germany | 33/706 |
| 250368 | 10/1987 | German Democratic Rep. | 33/706 |
| 262481 | 10/1987 | German Democratic Rep. | 33/706 |
| 293190 | 8/1991 | German Democratic Rep. | 33/706 |

Primary Examiner—William A. Cuchlinski, Jr.
Assistant Examiner—G. Bradley Bennett
Attorney, Agent, or Firm—Nies, Kurz, Bergert & Tamburro

[57] ABSTRACT

A scale system for absolute measurement includes at least one scale (1') which extends along a measuring length, and at least one measuring slide which is movable in relation to the scale. The system includes a fine sensor which functions to measure the absolute values within each of the intervals lying along the scale (1'), and further includes a rough sensor which functions to measure the absolute values with regard to the interval in which the fine sensor is located at that time. The scale system further includes at least one rough scale (2', 3') whose scale electrodes (2a, b, 3a, b) define a predetermined angle to the direction in which a measuring slide is moved along the scale, wherein the measuring electrodes of the measuring slide also define a preferably corresponding angle (α) with the direction of slide movement, whereby a determined displacement of the slide in the slide movement direction will be corresponded by a determined relative movement between the measuring electrodes of the measuring slide and the scale electrodes of the rough scale in a direction perpendicular to the extension of the scale electrodes, this direction defining a predetermined angle with the aforesaid direction of slide movement.

10 Claims, 4 Drawing Sheets

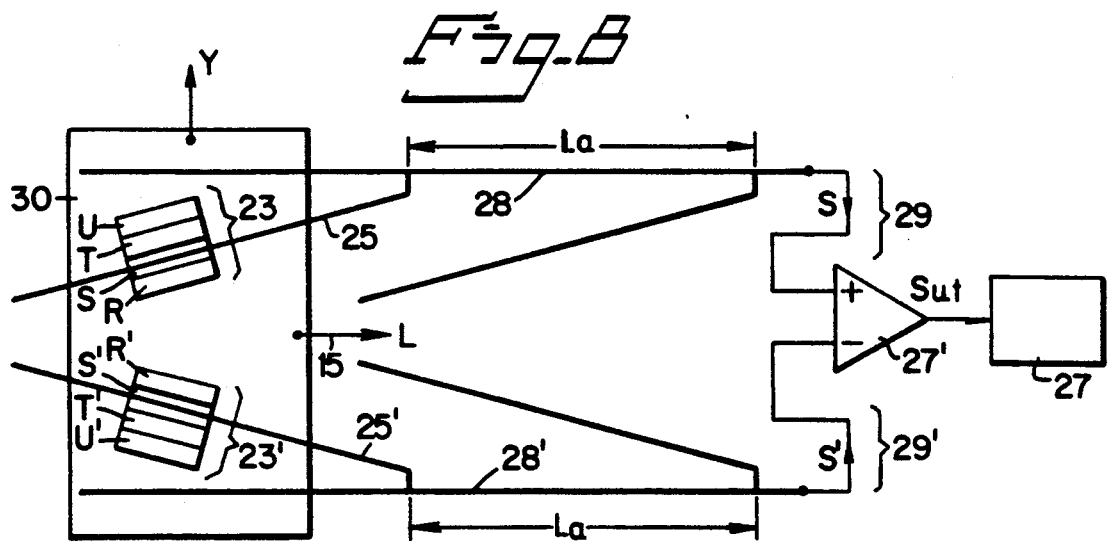
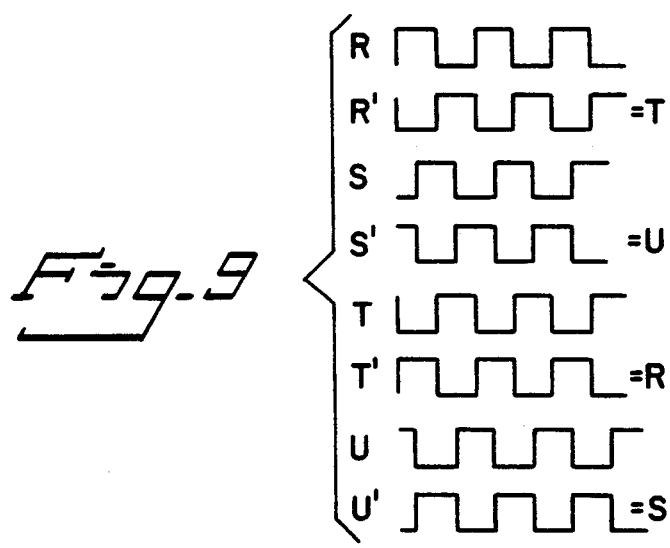
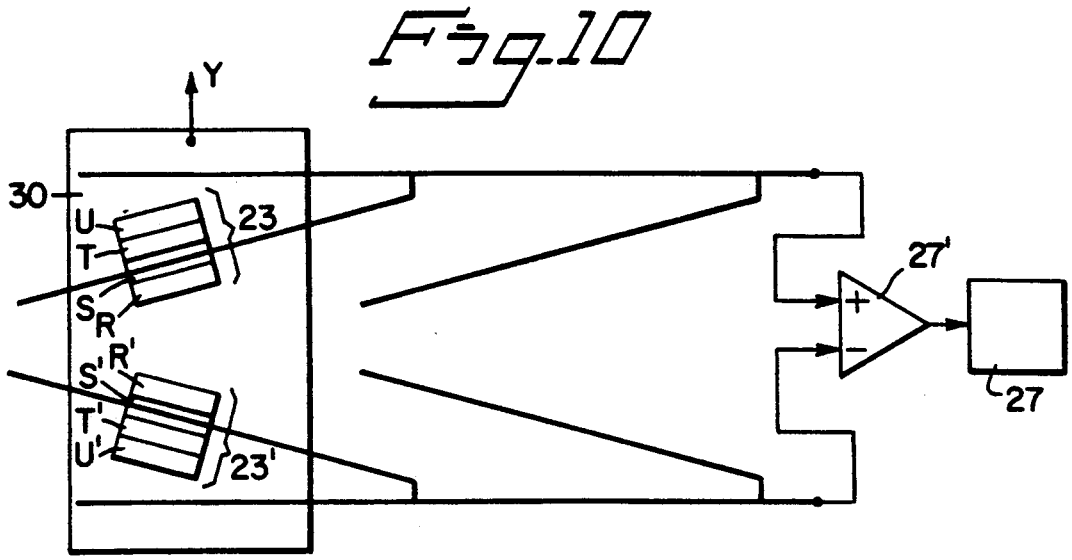

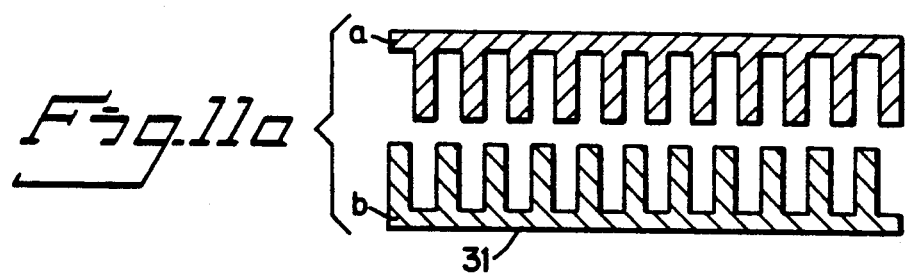
Fig. 11a
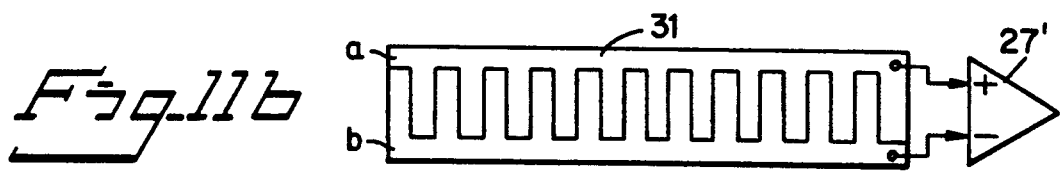
Fig. 11b
Fig. 12
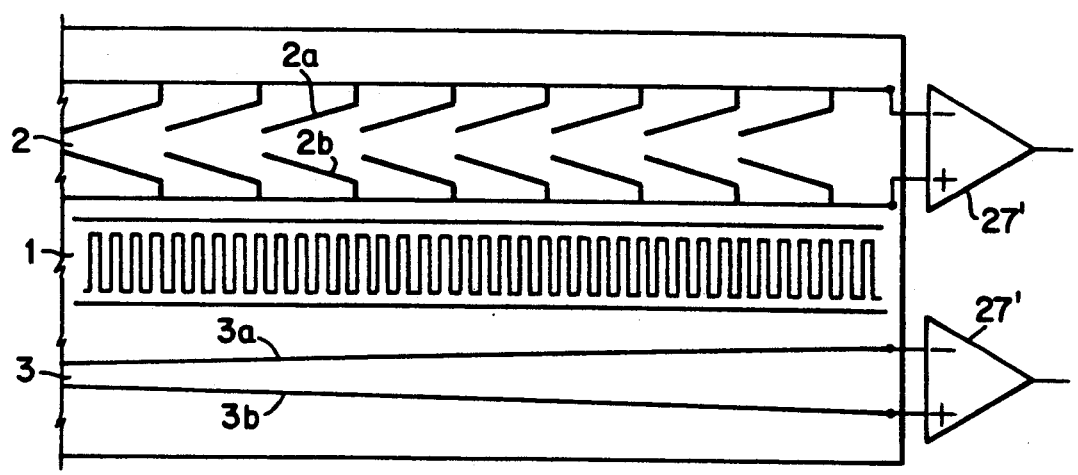

ABSOLUTE MEASUREMENT SCALE SYSTEM

BACKGROUND OF THE INVENTION

1. Field of the Invention

The present invention relates to a scale system for absolute measurements, including at least one scale which extends along a measuring length and a measuring slide which is movable in relation to the scale, a fine sensor which functions to measure the absolute values within each of the mutually sequential intervals or graduations along the scale, a rough sensor which functions to measure the absolute values with respect to that interval or graduation within which the fine sensor is located at that particular time, and wherein each scale includes scale electrodes which are disposed in a predetermined pattern and which are intended to coact with measuring electrodes mounted at respective measuring heads, wherein a supply voltage is applied to the measuring electrodes to achieve capacitive measuring, and wherein said scale system further comprises a signal includes unit.

2. Description of the Related Art

Systems of this kind are known to the art. However, such known systems are encumbered with serious drawbacks. In known systems which "switch" between two scales that have mutually different graduations, the electrodes must be spaced apart extremely accurately if a comparatively large total measuring length is to be achieved. In other known systems which employ a photoelectric rough scale based on the so-called gray code, it is necessary to use highly complicated measuring heads which need to surround the scale and which include a light-transmitting unit on one side of the scale and a photoreceptive array on the other side thereof. In order to obtain a reasonable scale length, some known systems also require a measuring slide which has a long axial extension in the direction of movement of the slide.

SUMMARY OF THE INVENTION

The present invention relates to an absolute, capacitive measuring system which, among other things, enables long measuring lengths to be obtained without requiring the electrodes to be spaced apart with high precision and which will also enable relatively simple and short measuring slides to be used. The invention also provides several other important improvements to the known prior art.

The present invention thus relates to an absolute measurement scale system which includes at least one scale that extends along a measuring length, at least one measuring slide which is movable in relation to the scale, a fine sensor for measuring the absolute values within each of the graduations along the scale, a coarse sensor for measuring the absolute values with regard to the interval in which the fine sensor is located at that particular moment, and a signal processing unit, wherein each scale includes scale electrodes which are disposed in a predetermined pattern and which coact with measuring electrodes mounted adjacent a measuring slide, and wherein a supply voltage is applied to the measuring electrodes for capacitive measurement.

The system is mainly characterized in that there is provided at least one rough scale whose scale electrodes define a predetermined angle ($\alpha$) with the direction of movement of a measuring slide along said scale; in that the measuring electrodes of the measuring slide also preferably define a corresponding angle ($\alpha$) with said direction of slide movement, whereby a given linear displacement (L) in said movement direction is corresponded by a given relative linear displacement (S) between the measuring slide electrodes and the rough scale electrodes in a direction ($\alpha'$) perpendicular to the extension of the scale electrodes, said direction defining a predetermined angle with said direction of linear displacement.

BRIEF DESCRIPTION OF THE DRAWINGS

The invention will now be described in more detail with reference to exemplifying embodiments thereof and also with reference to the accompanying drawings, in which

FIG. 8 illustrates two scales according to FIG. 7 where supply is in counterphase between the scales;

FIG. 9 illustrates counterphase supply in signal form;

FIG. 10 illustrates counterphase supply according to FIGS. 8 and 9 in measuring electrode form with scales according to FIG. 8;

FIG. 11a illustrates schematically two fine scales where the scales are mutually phase-shifted and FIG. 11b two fine scales where the transmission parts of the scale electrodes are mutually joined; and FIG. 12 illustrates schematically part of an inventive scale system according to a third embodiment, this embodiment being preferred in some cases.

DESCRIPTION OF THE PREFERRED EMBODIMENTS

Figure 1:
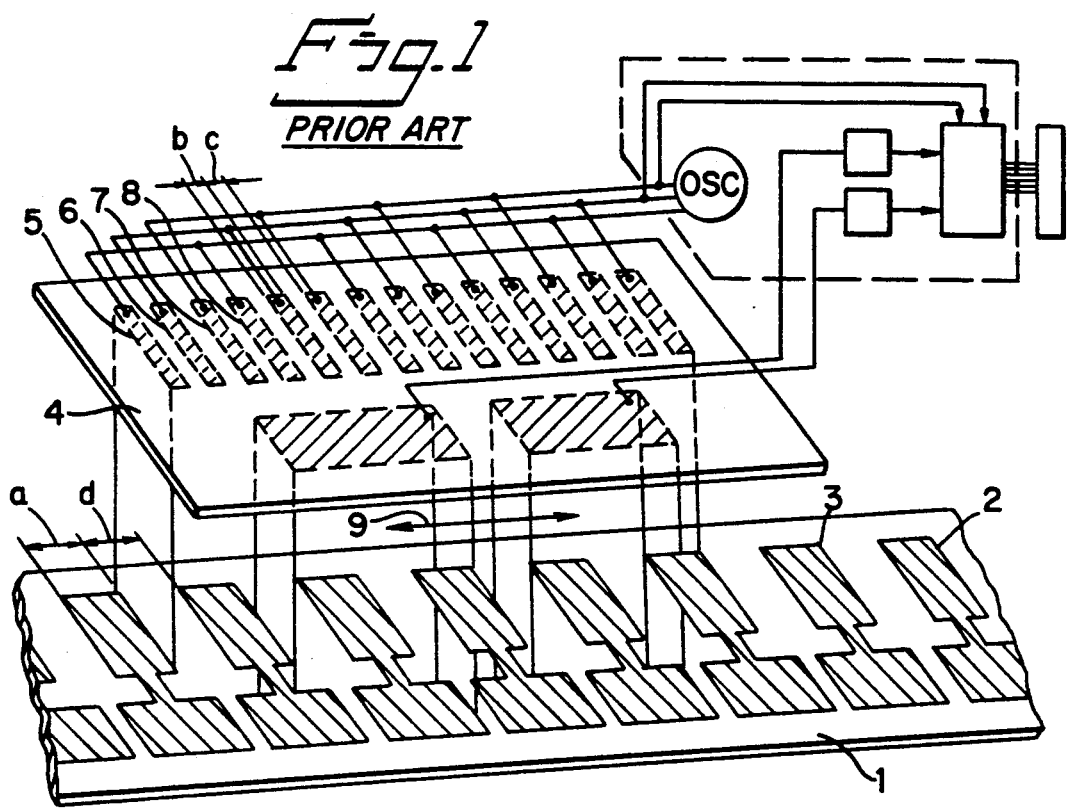
FIG. 1 illustrates schematically part of a fine scale and a measuring slide of a known scale system.

The known scale system illustrated in FIG. 1 is described in detail in Swedish Patent Specification No. 7714010-1 and includes, among other things, a graduated scale 1 which is provided with a first system of scale electrodes 2, 3 and a measuring slide 4 which is displaceable along the scale and which is provided with a second electrode system 5–8. The electrode spacing, or electrode division, is chosen so that $$p = P/n$$

where
- p = the electrode spacing of the slide;
- P = the electrode spacing of the scale; and
- n = the number of electrodes in each phase group on the slide.

The direction of slide movement is shown by the arrow 9. Each electrode of an electrode group is supplied with an alternating voltage in accordance with a cyclic pattern. For the purpose of amplifying the useful signal, there is normally included a plurality of parallel-coupled phase groups on the slide 4, and in order for the scale system to operate efficiently, the slide must include at least one whole phase group of measuring electrodes 5-8.

Since the length of a phase group is directly connected with the length of the scale period, the greatest permitted length of the slide will also determine the greatest permitted length of the scale period. For practical reasons, among others, the slide cannot be permitted to be excessively long. A maximum length is preferably about 50-100 mm. The maximum working range of the slide is thus about 100 mm, which unfortunately is much too small for the majority of applications.

Figure 2:
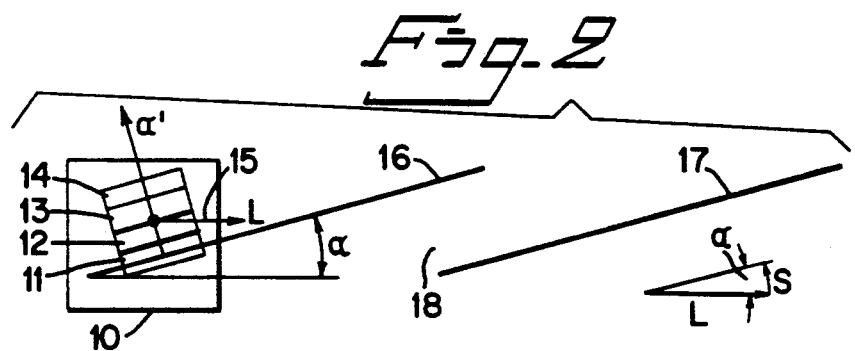
FIG. 2 illustrates diagrammatically the principles of a rough scale and a measuring slide according to the present invention.

The principle, inventive scale system illustrated in FIG. 2 also includes a measuring slide 10 provided with measuring electrodes 11-14. The direction in which the slide is moved is shown by the arrow 15. The FIG. 2 system also includes a rough scale 18 which is provided with scale electrodes 16, 17 which define a predetermined acute angle $\alpha$ with the aforesaid direction of slide movement 15, where the measuring electrodes 11-14 of the measuring slide also define a predetermined angle with said movement direction 15, this angle preferably corresponding to the angle $\alpha$. Thus, a given movement distance L of the slide in said movement direction 15 will correspond with a given relative movement distances between the measuring electrodes 11-14 of the measuring slide and the scale electrodes 16, 17 of the rough scale in a direction $\alpha'$ perpendicular to the extension of the scale electrodes 16, 17, this direction defining a predetermined angle $\alpha + 90°$ with the aforesaid movement direction, as will be evident from FIG. 2.

Figure 3:
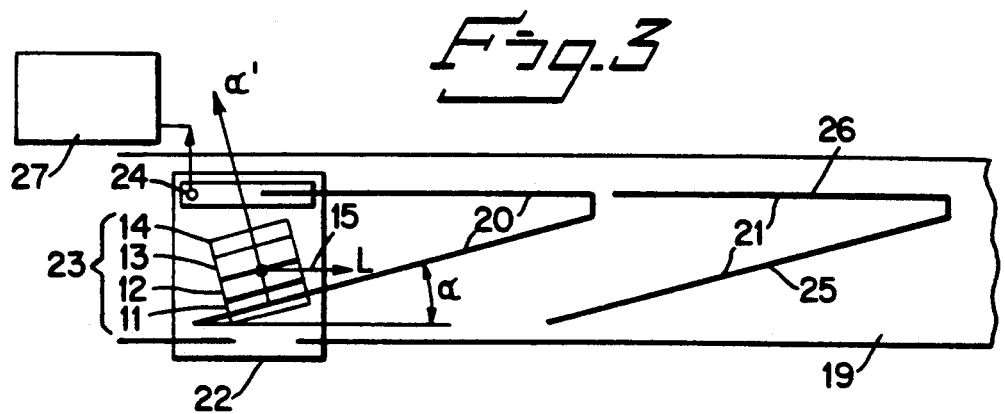
FIG. 3 illustrates schematically a first embodiment of a rough scale, measuring slide and signal transmission in accordance with the present invention.
Figure 4:
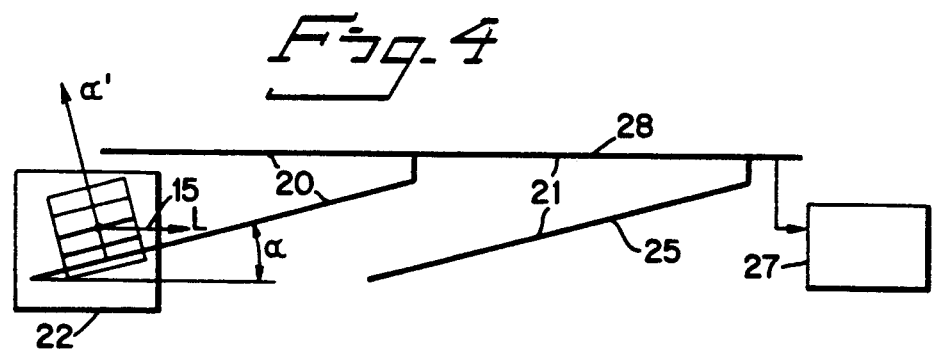
FIG. 4 illustrates schematically a second embodiment of a rough scale, etc., in accordance with the invention.

FIGS. 3 and 4 illustrate exemplifying embodiments of the invention in more detail. The reference numeral 19 identifies a scale which is provided with a plurality of, preferably equidistant, scale electrodes 20, 21. A measuring slide 22 mounted on the scale 19 is movable along the scale and carries a plurality of measuring electrodes 23 (11-14), transmitter electrodes 23 and, in the illustrated case, FIG. 3, receiver electrodes 24, which are arranged in a determined pattern. As before mentioned, each of the measuring electrodes is supplied with an alternating voltage in accordance with a cyclic pattern. The scale electrodes include transmission parts 26 and measuring parts 25 and the receiver electrodes 24 are intended to capture through the agency of said transmission parts 26 signals received by said measuring parts 25 and to transmit these signals to a signal processing unit 27 connected to the receiver electrodes.

Thus, the rough scale measuring electrodes 20, 21 include a measuring part 25 which defines said angle $\alpha$ with said movement direction 15, and a transmission part 26. In the case of the FIG. 3 embodiment, this transmission part 26, and similarly the measuring part 25, are separate and electrically isolated from the transmission parts and measuring parts of remaining scale electrodes, and transmission part 26 are intended to be sensed by means of at least one of the receiver electrodes carried by the measuring slide, from which receiver electrode signals are transmitted to the signal processing unit 27. In the case of the FIG. 4 embodiment, the transmission part 26 is connected to and forms part of a long transmission part 28, which is common to several scale electrodes and which is connected directly to the signal processing unit 27.

Figure 5:
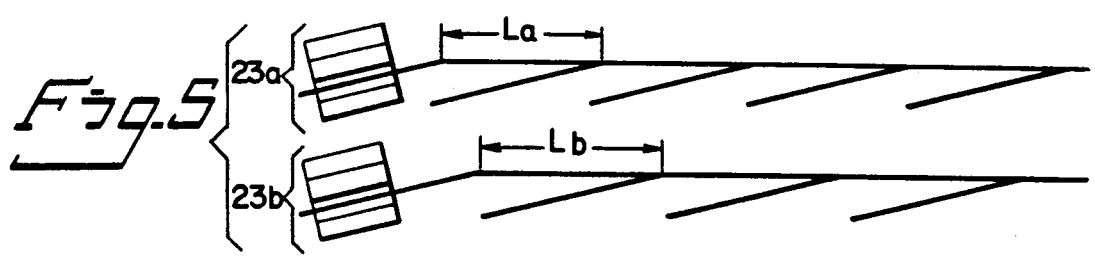
FIG. 5 illustrates schematically two different types of rough scales having mutually different period lengths.

The embodiment illustrated in FIG. 5 includes two types of rough scale 19a and 19b which have mutually different period lengths $L_a$, $L_b$ wherein the measuring process "switches" between the two scales so as to achieve an unequivocal determination of the absolute positions along the scales over a determined distance or period length M, in accordance with the equation $$M = L_a \times \left( \frac{L_a}{L_b - L_a} - 1 \right)$$

For instance, at $L_a = 131.072$ mm and $L_b = 135.168$ mm, phase M will equal 4194 mm which is sufficient for the majority of sizes of coordinate measuring machines or machining tools for instance. Naturally, the choice of $L_a$ and/or $L_b$ may be different from the aforesaid values so that M will be commensurately larger or smaller.

Figure 6:
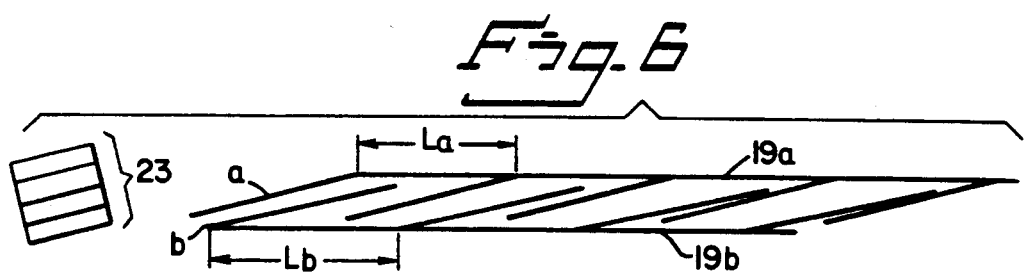
FIG. 6 illustrates two scales according to FIG. 5 in a compact, superposed configuration.

The scale configuration illustrated in FIG. 5 has a pronounced extension 6 transversely to the longitudinal axis of the scales. According to one embodiment, FIG. 6, which is preferred in some cases, the two rough scales 19a and 19b of a pair of rough scales of mutually different types and of different period lengths are arranged within one another, in interchanging relationship with their respective transmission parts on opposite sides of the scale configuration which includes the two scales, therewith to obtain a compact scale system. In the FIG. 6 configuration, one and the same array of measuring electrodes 23 on the slide can be used to deliver signals to both scales.

Figure 7:
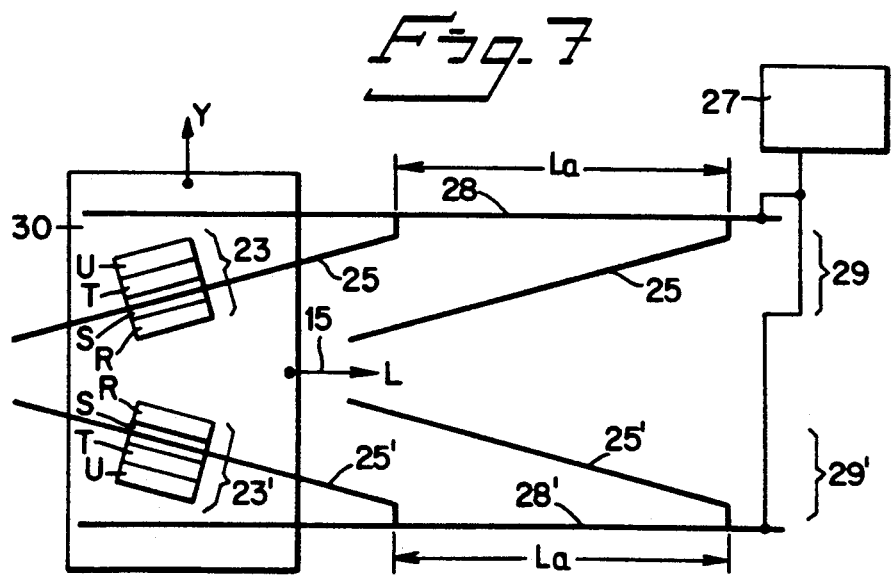
FIG. 7 illustrates schematically two differentially arranged rough scales, where the scales are mutually mirrored in a longitudinally extending plane.

As will be seen from FIG. 7, in order to further restrict sensitivity for movements perpendicular to the direction of slide movement, for instance as a result of obliqueness of the measuring parts of the rough scales, there is provided for each rough scale of determined period length, a first scale 29, a further, corresponding second rough scale 29', which is a mirror image of the first rough scale 29 in a plane which is parallel with the aforesaid movement direction 18. A measuring slide 30 includes measuring electrodes 23' for the second rough scale 29', these electrodes being a mirror image of the measuring electrodes 23 of the first rough scale 29, similar to the mirror-imaged scales 29, 29', and wherein the signals deriving from the two rough scales are co-processed to eliminate measuring errors deriving, for instance, from obliqueness of the rough scales. Thus, when the slide 30 is moved in the direction 15, the measuring electrode groups 23, 23' on the slide will be located simultaneously in the same position in relation to the measuring parts 25, 25' of the scale electrodes. On the other hand, in the event of relative movement between the slide and the scales in a direction Y transversely to the longitudinal axis of the scales, the upper measuring electrode group 23, which in the FIG. 7 example is in a position with the S-phase immediately above the measuring part 25, will be moved to a position where the R-phase comes progressively more into effect. In its initial position, the mirrored electrode group 23' is also located in a position with the S-phase immediately above the measuring part 25', and is displaced to a position in which the T-phase is brought further into effect. Since the R-phase and T-phase are mutually phase-shifted through 180°, any error contributions will cancel each other out. The arrangement illustrated in FIG. 7 thus renders the scale system insensitive to any movement in the Y-direction and to any lack of parallelity between scale 29, 29' and the movement direction 15 of the measuring system.

When mutually joined transmission parts 28, FIGS. 4 and 8, of the scales are used, there is a risk that these transmission parts will form together with the scale electrodes "antennas" which capture external electric interference, for instance interference signals from electric motors, lighting systems and the like. This problem is overcome with a preferred embodiment of the invention illustrated in FIGS. 8 and 9, according to which the power supply for the measuring electrodes 23' for the one 29' of the scales in a pair 29, 29' of mirrored scales is arranged for counterphase signals R', S', T', U' compared with the signals R, S, T, U for the other scale 29, so that the power supplies for mutually corresponding measuring electrodes will be phase-shifted through 180° relative to one another, wherein an operational amplifier 27' is provided for processing the signals of respective scales 29, 29'. The operational amplifier 27' and the transmission parts 28, 28' are arranged so that one common transmission part 28 is connected to the positive input (+) of the amplifier, whereas the other transmission part 28', delivering counterphase signals, is connected to the negative input (−) of the amplifier, so that both signals, for instance S and S' as shown in FIG. 8, will contribute equally to forming the output signal $S_{ut}$ from the operational amplifier. As opposed to the measuring signal, any interference signals will enter on both of the transmission parts 28, 28' with the same phase and direction (sense) and will therefore be suppressed in the amplifier 27'. The amplifier used will preferably be a high so-called common mode rejection amplifier.

As will be seen from FIG. 9, the 180° phase-shifted signals in a 4-phase supply system will result only in a 180° shift of the phase order in the mirrored array of measuring electrodes on the slide, wherein, as shown in FIG. 9, phase R' is identical with phase T, phase S' is identical with phase U, and so on. The relationship between counterphase and phase is thus:

R' = T

S' = U

T' = R

U' = S

The final phase supply picture shown in FIG. 10 is obtained when R', S', T' and U' are replaced with their equivalents according to the above table.

The preferred configuration of the fine scale illustrated in FIGS. 11a and 11b includes two scales a, b, where the scale electrodes of each scale have a common transmission part 31, which preferably extends over the full length of the scale, i.e. the scale electrodes are continuous over the full length of the scale. It is preferred in this case that each scale is connected directly to the signal processing unit 27. The scales a, b are preferably mutually phase-shifted through 180°, whereby two differential signals are obtained so as to enable external electrical interferences and disturbances to be suppressed with the aid of an operational amplifier 27' having so-called common mode rejection.

FIG. 12 illustrates another embodiment of rough scales which includes a first type of rough scale 2a, 2b of relatively short period length, for instance a period length of 131.072 mm, and a second type of rough scale 3a, 3b having a relatively long period length, in many cases preferably the full measuring length, for instance 2000 mm. Each rough scale 2', 3' is provided with differential scales and with differential, power supplies as described with reference to FIGS. 7, 8 and 9. In the case of this system, absolute measurement is effected by means of the fine scale scale 1' within its scale period, for instance 2.048 mm, and such that the position of the fine period concerned within a scale period of the most finely graduated rough scale 2' can be established with said rough scale 2', and so that the position of the shorter rough scale period concerned within the rough scale having the longest scale period can be established by means of the rough scale 3' having the longest scale period.

The manner in which the inventive scale system works will be evident essentially from the aforegoing. Thus, a fundamental feature of the inventive system is that the scale electrodes of the rough scale or scales are angled in relation to the movement direction 15, whereby relative movement a distance L in that direction, FIG. 2, will also result in relative movement between the measuring electrodes of the measuring slide and the electrodes of the scale in the movement sensitive direction $\alpha'$ of the system, wherein $\alpha$ can be chosen so as to enable a desired transmission ratio between the movements in directions 15 and $\alpha'$ to be disengaged in principle from the movement in the direction 15 and adapted to current requirements concerning resolution, acceptable slide length, etc.

It will also be evident that the present invention provides important advantages over the known technique. Less precision is required with respect to scale electrode spacing. The measuring slide can be given a simple construction. The system can be given a large absolute measuring range without needing to increase the length of the measuring slide to unreasonable limits. Other advantages are also afforded.

Although the invention has been described in the aforegoing with reference to exemplifying embodiments thereof, it will be understood that other embodiments and minor changes are conceivable within the concept of the invention.

For instance, according to the preferred embodiments, the scale period of the fine scale is 2,048 mm. Furthermore, the resolution of the signal processing unit is 1/4096 of the scale electrode spacing or division in the $\alpha'$-direction, this spacing being 4,096 mm in the case of the preferred embodiments. The resolution is thus 1 μm in said direction. With regard to the most finely graduated rough scale, $\alpha$ is preferably chosen so that L, i.e. the length travelled in the movement direction 15, FIG. 2, will be a binary multiple, 64, of the period length of the fine scale, 2.048 mm. In this case, $\alpha$ is 1.7908°. One unit in the resolution of the signal processing unit will then give a resolution in the slide movement direction 15, according to $$\text{Resolution in } L = \frac{64 \times 2.048}{4096} = 0.032 \text{ mm}$$

There is obtained an absolute measuring length of $64 \times 2,048 = 131,072$ mm with a measurement resolution of 32 μm over this length.

It will understood that the invention is not restricted to the aforedescribed and illustrated embodiments thereof and that modifications and changes can be made within the scope of the following claims.

We claim:

1. A scale system comprising: at least one scale extending along a measuring length, at least one measuring slide which is movable in relation to the scale along a direction of movement, a fine sensor for measuring absolute position values within distance intervals lying along the scale, a coarse sensor for measuring the absolute position values with regard to an interval within which the fine sensor is located at a particular moment, and a signal processing unit for receiving position signals, wherein each scale includes scale electrodes which are disposed in a predetermined pattern and which coact with measuring electrodes mounted for movement with the measuring slide, and including a power supply for providing a supply voltage to measuring electrodes carried by the measuring slide for capacitive measurement of position, wherein each scale further includes at least one rough scale having a plurality of scale electrodes that extend at a predetermined acute angle relative to the direction of movement of the measuring slide, wherein the measuring electrodes extend at the same predetermined acute angle relative to the direction of slide movement as the scale electrodes, whereby a given linear displacement of the slide in said slide movement direction results in a corresponding linear displacement of the measuring slide electrodes relative to the scale electrodes of the rough scale in a direction perpendicular to the acute angle between the scale electrodes and the direction of movement of the slide.

2. A system according to claim 1, wherein the scale electrodes of the rough scale include a measuring part which extends at said acute angle relative to said slide movement direction, and a transmission part that is separate from transmission parts of other scale electrodes and is sensed by the measuring electrodes carried by the measuring slide, wherein the measuring electrodes provide measurement signals to a signal processing unit.

3. A system according to claim 1, including two opposed rough scales which each have mutually different period lengths, wherein alternations of measurements obtained from each of the two rough scales determine absolute positions over a determined distance, wherein the predetermined distance is defined according to the relationship $$M = L_a \times \left( \frac{L_a}{L_b - L_a} - 1 \right)$$

wherein M is the predetermined distance, $L_a$ is the period length of one period for one of the opposed rough scales and $L_b$ is the period length of one period for the other of the opposed rough scales.

4. A system according to claim 3, wherein the two rough scales are disposed in interengaging relationship so as to obtain a scale system of small size.

5. A system according to claim 1, wherein each rough scale includes a first rough scale and a second rough scale, wherein the second rough scale is a mirror image of the first rough scale in a plane which extends parallel with said movement direction and which is perpendicular to a plane containing the first rough scale; wherein the second rough scale includes measuring electrodes that are a mirror image of the measuring electrodes of the first rough scale, so that when measurement signals from the two scales are combined measuring errors which derive from measuring slide movement in a direction transverse to said measuring slide movement direction are eliminated.

6. A system according to claim 5, wherein a power source is coupled with the measuring electrodes of of the mirror-imaged scales and the power source provides to the measuring electrodes of each rough scale power that is phase-shifted through 180° relative to the phase of the power provided to the other rough scale; and wherein the system includes an operational amplifier for processing measurement signals derived from respective scale electrodes to provide common mode rejection of unwanted signals for eliminating interference.

7. A system according to claim 1, wherein the rough scale includes a first rough scale having a relatively short period length and a second rough scale having a relatively long period length, wherein the period length of the second rough scale has the same length as the measuring length of the system.

8. A scale system according to claim 1, including a fine scale defined by a plurality of spaced fine scale electrodes that extend from and that are spaced along a transmission part, and a signal processing unit coupled with the transmission part for receiving and processing signals provided by the transmission part during a measuring operation.

9. A scale system according to claim 8, wherein the fine scale includes two fine scales which are mutually phase-shifted by 18020 ; and wherein the system includes an operational amplifier coupled with each of the two fine scales for processing measurement signals provided by the two fine scales during a measuring operation to suppress external electrical interferences that are common to the measurement signals from the respective two fine scales.

10. A system according to claim 1, wherein the scale electrodes of the rough scale include a measuring part which extends at said acute angle relative to said slide movement direction, and a transmission part that is connected with corresponding transmission parts of other rough scale electrodes to define a common transmission part, wherein the common transmission part is coupled with a signal processing unit for processing signals from the common transmission part.

* * * * *

UNITED STATES PATENT AND TRADEMARK OFFICE
CERTIFICATE OF CORRECTION

PATENT NO.  : 5,333,390

DATED       : August 2, 1994

INVENTOR(S) : Bo Petterson and Carl E. Gustaffsson

It is certified that error appears in the above-identified patent and that said Letters Patent is hereby corrected as shown below:

Column 8, line 42, delete "18020" and insert therefor --180°--.

Signed and Sealed this

Twenty-seventh Day of September, 1994

Attest:

BRUCE LEHMAN

Attesting Officer

Commissioner of Patents and Trademarks